Patented Oct. 13, 1931

1,827,356

UNITED STATES PATENT OFFICE

ANTONIO FERRETTI, OF MILAN, ITALY, ASSIGNOR TO SOCIETÁ INVENZIONI BREVETTI ANONIMA-TORINO, OF TURIN, ITALY

TREATMENT OF ANIMAL FIBERS

No Drawing. Application filed December 30, 1929. Serial No. 417,601.

This invention relates to a method of treating animal fibers such as tanned and untanned hides, scraps and cuttings therefrom, and has for one of its objects the provision of a method for treating such materials whereby a vulcanized product may be produced possessing physical properties of an improved character as compared with products made from similar materials by the methods employed heretofore.

A further object of my invention is the provision of a process for the treatment of animal fibers such as those above mentioned wherein the process may be carried out continuously and whereby a uniform product will be produced.

A still further object of my invention is the provision of a process wherein a vulcanized fibrous sheet material may be produced, the tenacity of the sheet material, that is to say, its resistance to tearing being much improved over the materials produced from animal fibers by the methods heretofore employed.

In the practice of my invention a rubber latex is employed as a binder for binding the fibers which are undergoing treatment to each other, as distinguished from the use of binders composed of rubber dissolved in a solvent, the problems relative to the treatment of animal fibers employing rubber dissolved in a solvent as a binder being entirely different from those which present themselves when employing rubber latex as a binder.

Perhaps the essential difference in the use of two such binders resides in the fact that rubber dissolved in a solvent cannot be mixed with a watery solution in which it would precipitate and therefore the vulcanizing agents employed must themselves be soluble or emulsifiable in the rubber solvents, if it is desired to vulcanize the rubber in its solution. Otherwise the product must be vulcanized after completion, and I have found it difficult to cause the vulcanizing agents and the accelerators used therewith to penetrate sufficiently into the material undergoing treatment to give a uniformly vulcanized product.

Another objection, aside from lack of uniformity in vulcanization where vulcanization is effected after the product has been completed, is the high temperatures necessary to effect vulcanization, these high temperatures having a deleterious effect upon the animal fibers in that they weaken the same and the tenacity, i. e., resistance to tearing of the product is materially reduced.

The present invention provides a process whereby the binder employed is one which can be mixed with the slurry of the fibers and precipitated therein, this slurry comprising the fibers suspended in water, and this permits of a vulcanizing agent as well as accelerators and antioxidants, which are miscible in water, i. e., either soluble or emulsifiable in water, to be employed and hence eliminates the necessity of excessively high temperatures in order to effect the vulcanization and insures a uniformly vulcanized product.

I am aware that vulcanized latex is a commercial article today but such a material is not suitable for incorporation as a binder under the present invention, in that the use of a vulcanized latex as a binder robs the finished product of a great deal of its tenacity due to the fact that the vulcanized latex is much less adhesive than the unvulcanized latex and consequently if the fibers are bound together with this vulcanized latex the resulting product necessarily has its tenacity, i. e., resistance to tearing reduced and will be much less sastisfactory than where the latex is incorporated and vulcanized in situ.

I am also aware that alkaline sulphides such as ammonium sulphides, potassium sulphides, sodium sulphides and combinations of these sulphides can be used as a vulcanizing agent for latex, but I have found, however, that the presence of alkaline sulphides is detrimental when treating animal fibers and the resulting product is not satisfactory.

In the type of vulcanization just referred to, that is to say, when using alkaline sulphides, the binder and the sulphides, with or without accelerators, are added to the fibers an appreciable time prior to the extracting of the liquids of the slurry. I have found that this is not satisfactory so far as the treating of animal fibers is concerned in that the vulcanizing action proceeds to a detrimental extent prior to the extracting of the liquids of the slurry which diminishes the resistance to tearing of the finished product. I find also that this method is not satisfactory in the treating of animal fibers in that it is exceedingly difficult, if not impossible, to obtain a uniform finished product.

The method of this invention, as will be pointed out hereinafter, can be carried out continuously and on an industrial scale with the assurance that the finished product will be uniform and with the assurance that the tenacity of the finished product will be satisfactory.

With all of the above in mind, therefore, my process comprises a method for the treatment of animal fibers by which a uniform vulcanized product is obtained, wherein the first step is the production of a slurry comprising the fibers undergoing treatment in aqueous suspension. It will be understood that industrially this slurry will be made up in large quantities and will be drawn off continuously as hereinafter explained. To this slurry I add a rubber latex as a binder, a vulcanizing agent such as colloidal sulphur, an accelerator such as pipsol or other suitable organic accelerator, or I may employ an inorganic accelerator such as zinc oxide, any suitable anti-oxidant, and a coagulant such as sodium chloride. Anti-oxidants are well known as materials which will retard aging.

All of these materials just mentioned are miscible in water, that is, soluble, emulsifiable or dispersable, and hence may be added to the fibrous slurry which comprises the fibers undergoing treatment in water.

It is to be understood that the materials which are added to the slurry are not necessarily added in the order mentioned. As a matter of fact it may be preferable to add a part of the vulcanizing agent, such as sulphur, to the slurry before the addition of the latex, the latex, the coagulating agent, the accelerator, the anti-oxidant, and the remainder of the vulcanizing agent then being added. In any event all of these materials are added continuously and at a uniform rate as the slurry is being advanced toward the reticulated member upon which the slurry is finally deposited and where the liquids of the slurry are extracted.

It must be borne in mind that one of the primary objects of this invention is the provision of a product which is as nearly as possible uniformly vulcanized throughout and by adding a part of the vulcanizing agent to the slurry prior to the addition of the binder and of the other materials, some of this vulcanizing agent will be taken up by the fibers undergoing treatment, so that in effect after all of the materials have been incorporated the rubber of the latex will be subjected to the vulcanizing action not only of the sulphur or other vulcanizing agent added with or subsequently to the latex, but will be subjected to the action of the sulphur which has been originally added and which, as above explained, has been taken up by the fibers themselves. Consequently I am assured that the rubber of the latex will be thoroughly vulcanized.

As above noted the slurry is deposited upon a reticulated member where the liquids of the slurry are extracted in any suitable manner as by the use of suction boxes, for example, and the product left upon the reticulated member may then be passed through pressing rolls and dried. The drying operation is carried out in an elevated temperature which facilitates and accelerates the desired vulcanization.

If a sheet material is to be produced, then it will be understood that the product left upon the reticulated member may be removed therefrom, passed through pressing rolls which may be heated where a part of the vulcanizing step will be performed, the sheet material then passing to drying chambers, if this is found necessary, for completion of the vulcanizing operation.

It will be appreciated, therefore, from the foregoing that the above process will produce a thoroughly and uniformly vulcanized product, that is to say, a product which is vulcanized throughout, which as above pointed out is not possible with those methods wherein the vulcanizing agent is added and vulcanization carried out after the product has been formed, that is to say, where the vulcanizing agent is added as the last step of the method.

The relative proportions of the various ingredients employed in the practice of my invention may be varied, of course, within wide limits depending upon the type of finished product desired.

The following is merely by way of example:

In making the slurry sufficient water is employed to enable the slurry to flow readily.

The amount of vulcanizing agent employed, such as sulphur, for example, may be 2% to 10% by weight of the dry rubber content of the latex.

The amount of anti-oxidant may be from 1% to 3% by weight of the dry rubber content of the latex.

The amount of accelerator may be from 0.5% to 2% of the dry rubber content of the latex.

The amount of sodium chloride or other coagulant for the rubber of the latex may be varied within wide limits, the desideratum being coagulation of the rubber of the latex.

The slurry may be kept at a luke warm temperature although this is not essential to the successful practice of my invention.

The vulcanizing temperature employed in the drying room, if a drying room is used, may be from 30° to 80° C. according to the type of tanning agent employed, that is to say, whether a vegetable tanning agent such as sumach or a mineral tanning agent such as chrome is employed. I have found that if chrome is employed as a tanning agent then the higher temperatures mentioned may be employed without detrimentally affecting the fibers.

I have not referred to the addition of dyeing agents, tanning agents, etc. to the slurry inasmuch as the addition of these materials is a matter of choice and so far as the addition of tanning agents is concerned whether or not these are added will depend upon whether one is treating untanned hides, scraps and cuttings therefrom or tanned hides, scraps and cuttings therefrom, as will be understood by those skilled in this art.

I may mention, however, in respect to the tanning agents that if sumach is employed as a tanning agent, or if the fibers being treated are sumach tanned, then the use of an accelerator may be omitted with good results, the sumach in itself acting as an accelerator of vulcanization.

In the above recital of the various steps employed in my method I have mentioned sulphur as the vulcanizing agent and the absence of alkaline sulphides. It is to be understood, however, that vulcanizing agents other than sulphur may be used, for example, pentasulphide of antimony and trisulphide of antimony, both of which materials are but slightly, if at all, alkaline. In the use of such materials the same should be finely ground with a dispersing medium so as to obtain a very fine colloidal watery solution suitable for addition to the slurry. It is to be understood that accelerators and anti-oxidants may be used with these materials if found desirable or necessary.

I have already pointed out above that uniformity of finished product is one of the advantages of my improved method over methods heretofore tried or suggested, and in this connection I wish to note that when practicing this invention on an industrial scale where the slurry will be made up in large quantities the latex, coagulating agent, the vulcanizing material, accelerators, etc. are added continuously, as distinguished from the batch method wherein all of these materials will be mixed together in batch form and afterward discharged upon a reticulated member where the liquids of the slurry are to be extracted. Consequently the elapsed time between the addition of the latex, vulcanizing agent, etc. and the extraction of the liquids of the slurry will be constant, resulting in a uniform product as distinguished from the batch method above referred to in which these materials are added at once, and the elapsed time between the addition of these materials and the extraction of the liquids of the slurry may vary several hours, with a consequent variation in the uniformity of the finished product, as a result of the progressive aging of the materials of the batch.

It will be understood also from the foregoing that the slurry is deposited upon the reticulated member for the extraction of its liquids before the vulcanizing of the rubber of the latex has progressed to an appreciable, that is to say, detrimental degree.

It will be understood also from all of the foregoing that in the practice of my invention as above outlined the finished product will be vulcanized throughout as well as uniformly. This is assured by reason of the fact that the vulcanizing agent is introduced at a time when the fibers and the rubber of the latex are in such condition that the vulcanizing agent and the rubber of the latex may enter as well as coat the fibers, uniformity of product as distinguished from thorough vulcanization being assured by reason of the fact that the binder and the vulcanizing agent therefor are added continuously as distinguished from the batch method.

What I claim is:—

1. The process which comprises adding a vulcanizing agent to a slurry of animal fibers and a latex binder therefor in aqueous suspension, and before vulcanization has proceeded to a detrimental degree extracting the liquids of the slurry.

2. The process which comprises adding colloidal sulphur to a slurry of animal fibers and a latex binder therefor in aqueous suspension, and immediately extracting the liquids of the slurry.

3. The process which comprises adding a sulphur and a rapid accelerator of vulcanization to an aqueous suspension of animal fibers and a rubber latex, and immediately extracting the liquids of the slurry.

4. The process which comprises adding a vulcanizing agent, an accelerator and an anti-oxidant to a slurry comprising animal fibers and a rubber latex in aqueous suspension, and extracting the liquids of the slurry before vulcanization has proceeded to a detrimental degree.

5. The process which comprises adding a vulcanizing agent and a rapid accelerator to a slurry of animal fibers with rubber latex in aqueous suspension, immediately extracting the liquids of the slurry, and thereafter subjecting the resulting product to a vulcanizing temperature.

6. The process which comprises the addition of a non-alkaline vulcanizing agent to a slurry comprising animal fibers and rubber latex in aqueous suspension, immediately extracting the liquids of the slurry, pressing, and finally drying at a vulcanizing temperature.

7. The process which comprises adding a vulcanizing agent and an accelerator, both miscible in water, to an aqueous suspension of animal fibers and rubber latex, extracting the liquids of the slurry, pressing, and then drying in a temperature between 30° and 80° C.

8. The process which comprises the formation of a slurry comprising animal fibers in aqueous suspension and the continuous addition at a uniform rate of a rubber latex and a vulcanizing agent for the rubber of the latex to the slurry, and the extracting of the liquids of the slurry.

9. The process which comprises the formation of a slurry comprising animal fibers in aqueous suspension and the continuous addition of rubber latex, a coagulant therefor and a vulcanizing agent, and the extracting of the liquids of the slurry, the addition of said materials and the extraction of the liquids of the slurry being effected at a uniform rate.

10. The process which comprises the formation of a slurry of animal fibers in aqueous suspension, the continuous addition of rubber latex and a vulcanizing agent thereto and the continuous extraction of the liquids of the slurry, whereby the elapsed time between the addition of said materials and the extraction of the liquids of the slurry is maintained constant.

11. In the treatment of animal fibers wherein a vulcanizing agent and rubber latex are added to a slurry of the fibers in suspension, the liquids of the slurry eventually being extracted, the process which comprises so regulating the addition of such materials and the extraction of the liquids of the slurry that the elapsed time between these steps will be substantially constant.

12. The process which comprises the formation of a slurry comprising animal fibers in aqueous suspension, the addition of latex and a vulcanizing agent for the rubber of the latex to the slurry in the order mentioned, a portion of the vulcanizing agent being added prior to the addition of the latex and of the remainder of the vulcanizing agent, and finally extracting the liquids of the slurry and subjecting the resulting product to a vulcanizing temperature.

This specification signed this 27th day of December, 1929.

ANTONIO FERRETTI.